United States Patent
Bohlander et al.

(10) Patent No.: US 6,924,744 B2
(45) Date of Patent: Aug. 2, 2005

(54) LIGHT EMITTING DIODE INDICATOR

(75) Inventors: Richard A. Bohlander, Snohomish, WA (US); Robert W. Metzger, Marysville, WA (US); Dwight R. Schaeffer, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 10/329,111

(22) Filed: Dec. 23, 2002

(65) Prior Publication Data

US 2004/0119603 A1 Jun. 24, 2004

(51) Int. Cl.⁷ .................................................. G08B 5/22
(52) U.S. Cl. .............................. 340/815.45; 340/815.4; 340/473; 340/908; 362/800; 362/812
(58) Field of Search .................... 340/815.4, 815.45, 340/815.53, 815.65, 473, 908.1, 908, 985; 362/800, 812, 240

(56) References Cited

U.S. PATENT DOCUMENTS

| | | | | |
|---|---|---|---|---|
| 5,659,641 A | * | 8/1997 | DeMeritt et al. | 385/14 |
| 5,783,909 A | * | 7/1998 | Hochstein | 315/159 |
| 5,990,802 A | * | 11/1999 | Maskeny | 340/815.45 |
| 6,156,980 A | * | 12/2000 | Peugh et al. | 174/252 |
| 6,265,984 B1 | * | 7/2001 | Molinaroli | 340/815.4 |
| 6,483,439 B1 | * | 11/2002 | Vukosic | 340/815.65 |
| 6,600,427 B2 | * | 7/2003 | Simon et al. | 340/815.49 |

* cited by examiner

Primary Examiner—Anh V. La
(74) Attorney, Agent, or Firm—Black Lowe & Graham PLLC

(57) ABSTRACT

A Light Emitting Diode (LED) indicator that more efficiently dissipates heat generated by LEDs and other circuit components is provided. The LED indicator includes a housing and a printed circuit board contained within the housing. The printed circuit board includes first and second sides with two or more LEDs attached to the first and second sides of the printed circuit board and a regulating circuit for regulating current supplied to the LEDs. The regulating circuit includes a linear voltage regulator. The printed circuit board includes first and second thermal dissipation sections. The first thermal dissipation section is thermally connected with the two or more LEDs and the second thermal dissipation section is thermally connected with the linear voltage regulator. The housing is at least partially lined with a plurality of reflectors for reflecting light generated by the LEDs through a lens.

22 Claims, 5 Drawing Sheets

LIGHT EMITTING DIODE INDICATOR

FIELD OF THE INVENTION

This invention relates to information display systems and, more particularly, to indicators for information display systems.

BACKGROUND OF THE INVENTION

Lighted indicators for aircraft cockpits have typically been illuminated with incandescent bulbs. Due to the short life of incandescent lamps, these indicators must include mechanisms that allow for removal of burned out lamps. Together with making the device more complex and costly, these mechanisms often fail or are damaged in service. Additional cost is reflected in high airline maintenance activity as a result of replacing burned out lamps and damaged indicators and associated airplane downtime. In addition to these reliability issues, there are other drawbacks with incandescent indicators. The light and color output emitted from incandescent lamps varies proportionally with input voltage applied. Under certain operating conditions, when the input voltage drops low enough, the brightness of the indicator can drop so low that it becomes difficult to recognize or see. In addition the brightness change the color that an incandescent lamp emits shifts towards the red spectrum as the voltage is reduced. In flight deck aviation applications the color that an indicator emits indicates to the flight crew what type of action is expected. For example red indicates to the pilot a condition that requires immediate action, where amber indicates a cautionary condition and white is used to indicate a normal operating condition. Thus with incandescent light indicators, the perceived color of the indicator can change with varying inputs voltages. This color ambiguity is particularly acute with indicators that display white or amber.

Recently indicators that use LEDs have been introduced in aircraft applications. If applied correctly LEDs can achieve significantly longer operating lifetimes than incandescent lamps resulting in little or no aircraft maintenance. Another advantage of LEDs is that their color spectrum remains essentially constant as their power level is varied. The color emitted from an LED indicator therefore is very consistent with input power levels, thus providing the flight crew with a very unambiguous color indications. However this color stability presents a difficulty when mixing LED indicators with incandescent indicators since the color of the two types can only match at a single unique input power or voltage level. For example the color of an amber LED indicator essentially matches the color of a white incandescent indicator when operating at lower brightness operating levels thus introducing the potential of miss-alerting the flight crew.

While LEDs can exhibit many positive characteristics, there are design constraints that must be recognized in order to realize a longer life, lower cost LED driven indicator. LEDs are voltage devices and therefore require a means to limit the current supplied as the voltage is increased above their intrinsic forward voltage drop. When operating LEDs in series strings, as is often done, the sum of the forward voltage drops can exceed the input voltage available. In this circumstance a more complicated power supply is required to raise the voltage supplied to the LEDs to the level necessary to turn on the LEDs. In addition to the increased complexity and cost of this voltage conditioning circuitry, it often results in excess heat and high electromagnetic emissions. Although LEDs potentially have extremely long life expectancy, failure to regulate the power adequately or allowing the temperature of the semiconductor junction of the LED to exceed the limit of the material, can cause the LED to fail prematurely. Operating the LED under excessive heat loads will also reduced the expected lifetime and overall light output.

The physical outline and electrical interface of flight deck aviation indicators has varied significantly from one aircraft design to another. This often precludes the ability to interchange indicators from one airplane model to another. This results in higher manufacturing cost due to the increased number part numbers to inventory, which also translates to higher airline hardware maintenance inventory costs.

Therefore, there is an unmet need for a cheaper-to-build, more reliable LED indicator.

SUMMARY OF THE INVENTION

The present invention provides a Light Emitting Diode (LED) indicator that more efficiently dissipates heat generated by LEDs and other circuit components, thereby allowing for a simpler circuit design and thus a less expensive manufacturing process than previous LED indicators. Other advantages of an exemplary embodiment, an LED indicator includes a housing and a printed circuit board contained within the housing. The printed circuit board includes first and second sides with two or more LEDs attached to the first and second sides of the printed circuit board and one or more regulating circuits for regulating current supplied to the LEDs. The present invention allows an LED indicator to by used interchangeably across various airplane models through a design that has a physical outline which is small enough to fit all airplane installations and is compatible with electrical wiring and power characteristics.

In one aspect of the invention, the regulating circuit includes a linear current regulator.

In another aspect of the invention, the printed circuit board includes first and second thermal dissipation sections. The first thermal dissipation section is thermally connected with the two or more LEDs and the second thermal dissipation section is thermally connected with the linear voltage regulator.

In still another aspect of the invention, the housing includes two opposing covers that are thermally coupled with the first and second thermal dissipation sections. The housing includes two opposing covers that form first and second cavities, wherein the second cavity is open at one end that is covered by a cap with a lens. The first cavity covers a part of the printed circuit board with the regulator circuit and the second cavity covers a part of the printed circuit board with the LEDs. The second cavity is at least partially lined with a plurality of reflectors for reflecting light generated by the LEDs through the lens.

In yet another aspect of the invention, the LEDs include at least two different colored LEDs.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
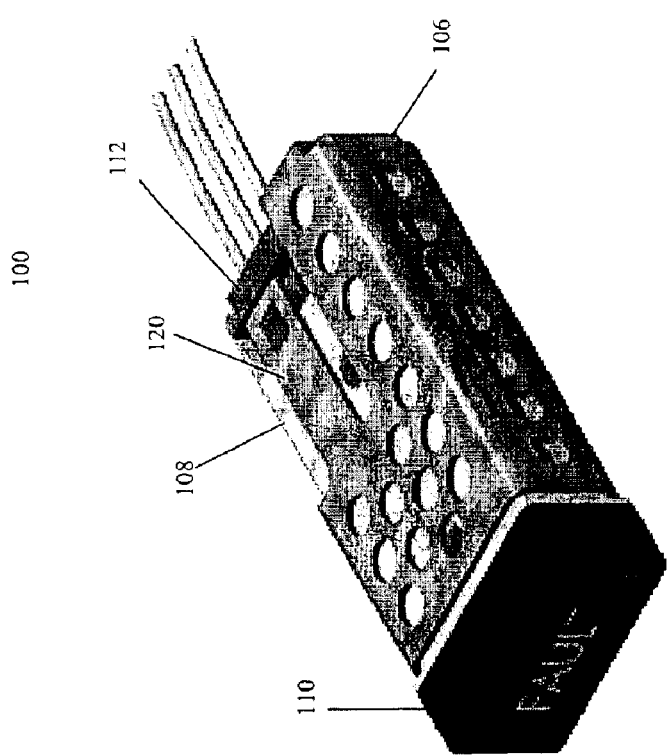
FIG. 1 illustrates a perspective diagram of an indicator formed in accordance with the present invention.

FIG. 1 illustrates a perspective view of a nonlimiting example indicator 100. The indicator 100 includes a mounting sleeve 106 that surrounds a housing 108. The housing 108 is capped on one end by a lens cap 110. An opposing end of the housing 108 is coupled with a connector plug 112. The indicator 100 is suitably shaped and sized to fit in most commercial aircraft flight deck installations. The indicator 100 is suitably secured to a flight panel using the mounting sleeve 106. The mounting sleeve 106 includes a flange 120 that allows the indicator 100 to be received by various panel installation schemes, such as without limitation through standard 0.940×0.440 mounting holes in flight panels. It can be appreciated that the type of electrical connector plug 112 used depends upon the type of wiring that is used in the aircraft receiving the indicator 100.

Figure 2:
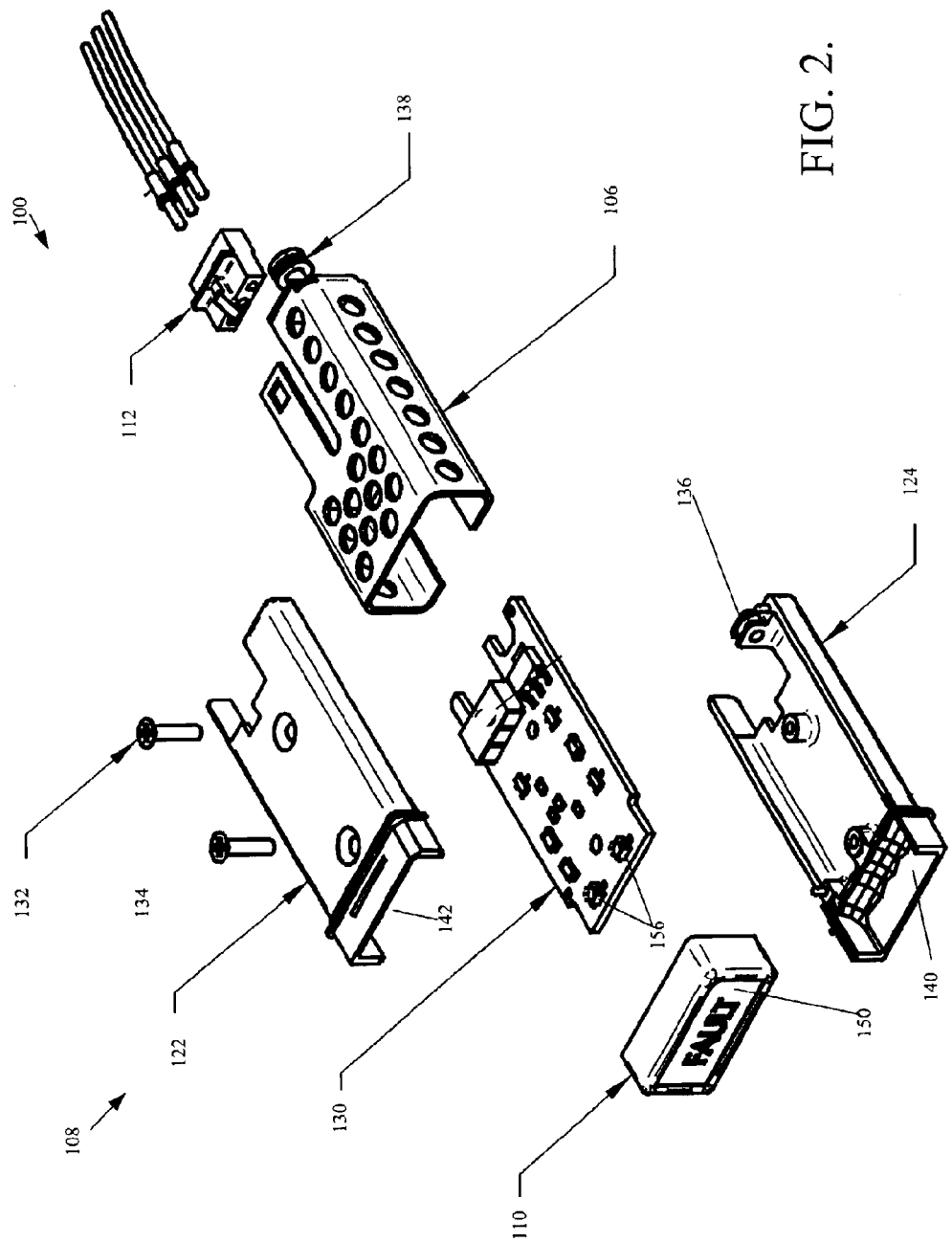
FIG. 2 illustrates an exploded view of the indicator shown in FIG. 1.

FIG. 2 illustrates a partial exploded view of the indicator 100 shown in FIG. 1. The housing 108 includes a first cover 122 and a second cover 124. The first and second covers 122 and 124 when coupled to each other form a cavity that supports a single printed circuit board (PCB) 130. The first cover 122 is attached to the second cover 124 through the PCB 130 using first and second screws 132 and 134. The first and second covers 122 and 124 are suitably two cast aluminum molded pieces or other thermally conductive metals that act as heat sinks for dissipating heat generated by components mounted on the PCB 130.

The PCB 130 includes first and second sides and first and second opposing ends. The first end includes LEDs 156 mounted on the first and second side. The second end includes devices for receiving the connector plug 112. The first end of the PCB 130 is received within a reflector cavity created by first ends of the first cover 122 and second cover 124. The second cover 124 includes a threaded receptacle 136 for receiving a screw 138 that attaches the mounting sleeve 106 to the housing 108. Nonlimiting examples of the LEDs 156 are red, amber, or green AlInGaP-type LEDs or green, blue, or white InGaN-type LEDs.

The lens cap 110 includes a lens 150 that filters light generated by the LEDs 156. The lens cap 110 is suitably constructed of black plastic, such as Ultem, with internal molded-in features (not shown) which retain the lens 150 and allow the lens cap 110 to snap over the first ends of the first and second covers 122 and 124. The lens 150 is suitably a laminated combination of Lexan and photographic emulsion layers that produce a highly-efficient, sunlight-readable, hidden legend-type display. In one embodiment, a first layer of the lens 150 suitably includes a 0.015 inch thick neutral density 8010 Lexan material. The first layer is suitably treated with an ultraviolet (UV) stable hard-coat that is resistant to most common solvents. A second layer includes a photographic emulsion that produces a legend indicia (i.e., words visible when the lens 150 is backlit by the LEDs 156). The second layer is suitably bonded to the top layer. A third layer of clear 0.020 inch 8010 Lexan is suitably bonded to the back of the second layer for adding strength to the lens 150. The third layer is also suitably treated with a UV hard coating. The coating on the third layer allows light received at angles greater than 30 degrees from orthogonal to penetrate and not reflect back to the light source.

Figure 3:
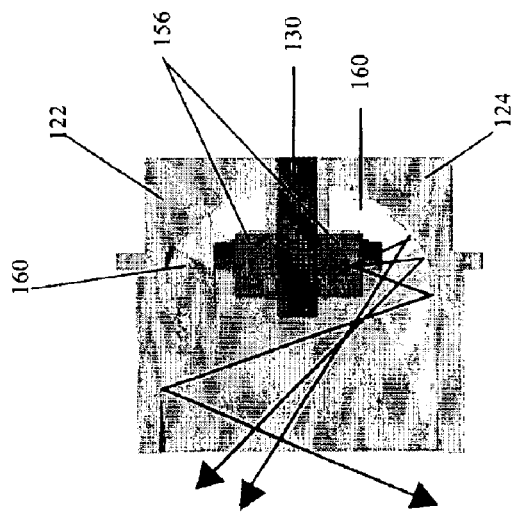
FIG. 3 illustrates a cutaway side view of a reflector portion of the indicator shown in FIG. 1.

FIG. 3 illustrates a cutaway side view of the cavity formed by the first ends of the first and second covers 122 and 124, that houses the LEDs 156. Within the first ends of the first and second covers 122 and 124 are multi-angled reflectors 160. The reflectors 160 suitably include a high efficiency specular reflective surfaces that are angled relative to the LEDs 156 for directing the LED generated light to be reflected through the lens 150.

Figure 4:
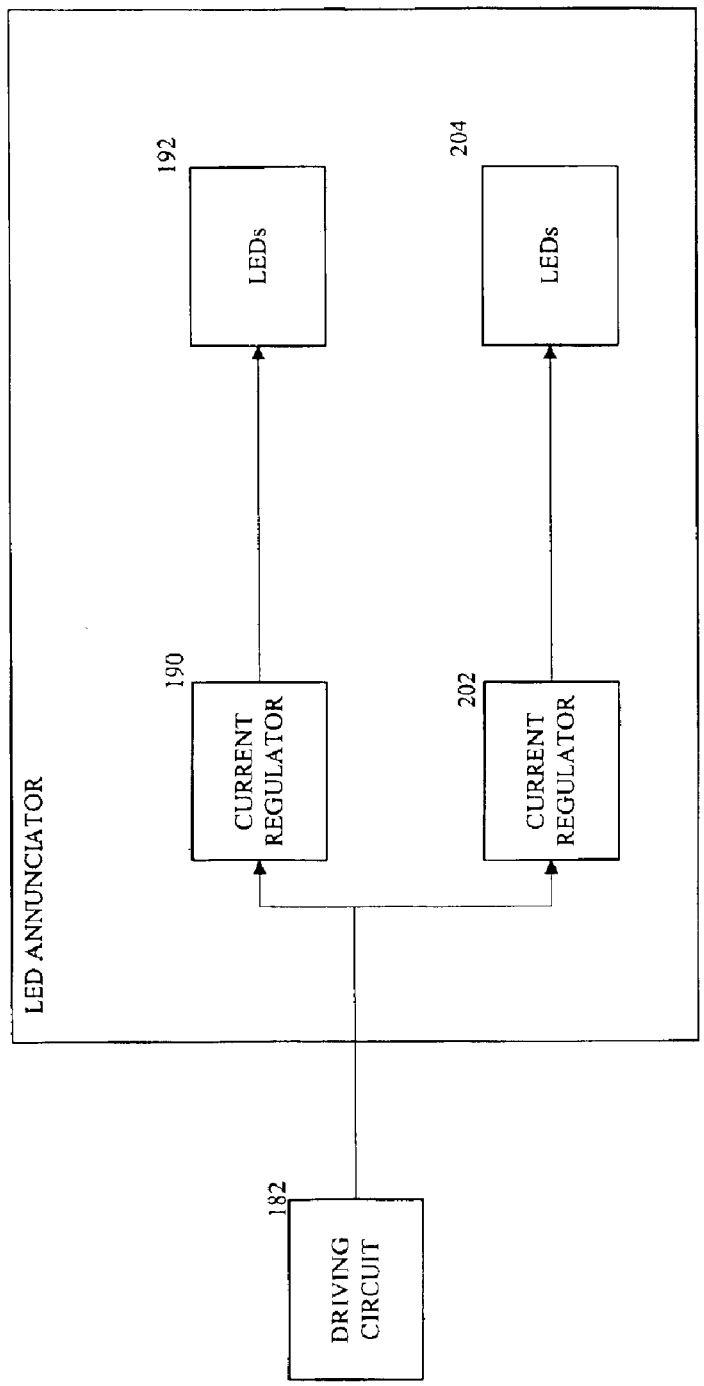
FIG. 4 illustrates a block diagram of electrical components used in the present invention.

FIG. 4 illustrates a nonlimiting example circuit 180 of the LED indicator 100 (FIG. 1). The indicator 100 is driven by a driving circuit 182 that sends voltage to the indicator 100 when the driving circuit 182 has determined that illumination of that indicator 100 should occur. The indicator 100 includes a first current regulator 190, a first set of light emitting diodes (LEDs) in series 192, a second current regulator 202, and a second set of light emitting diodes (LEDs) in series 204.

Because first and second set of LEDs 192 and 204 include 2 LEDs each and the current is regulated, the LEDs provide light when the voltage supplied by the driving circuit 182 falls below 8 Volts.

Figure 5:
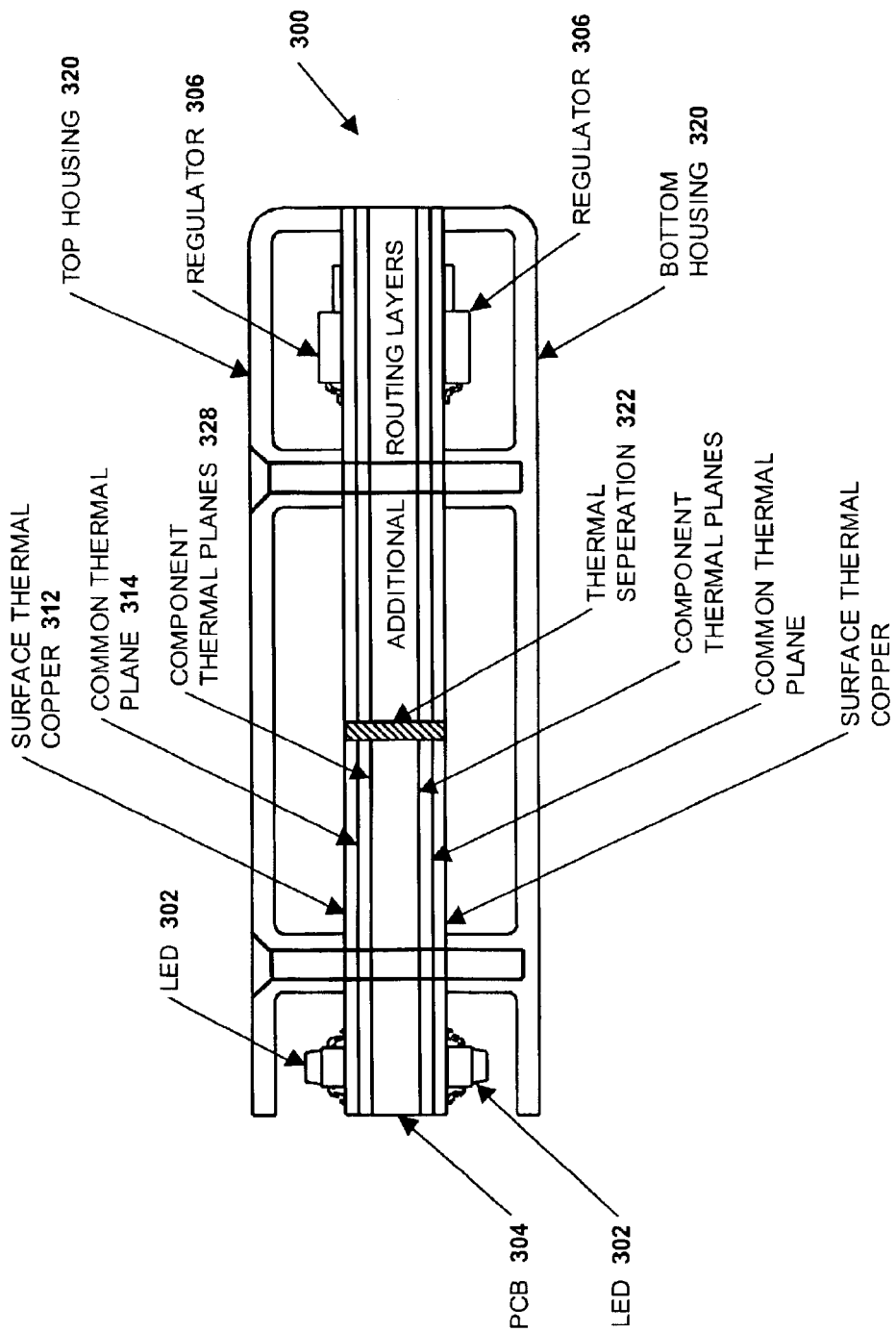
FIGS. 5 and 6 illustrate cutaway side views of the indicator.
Figure 6:
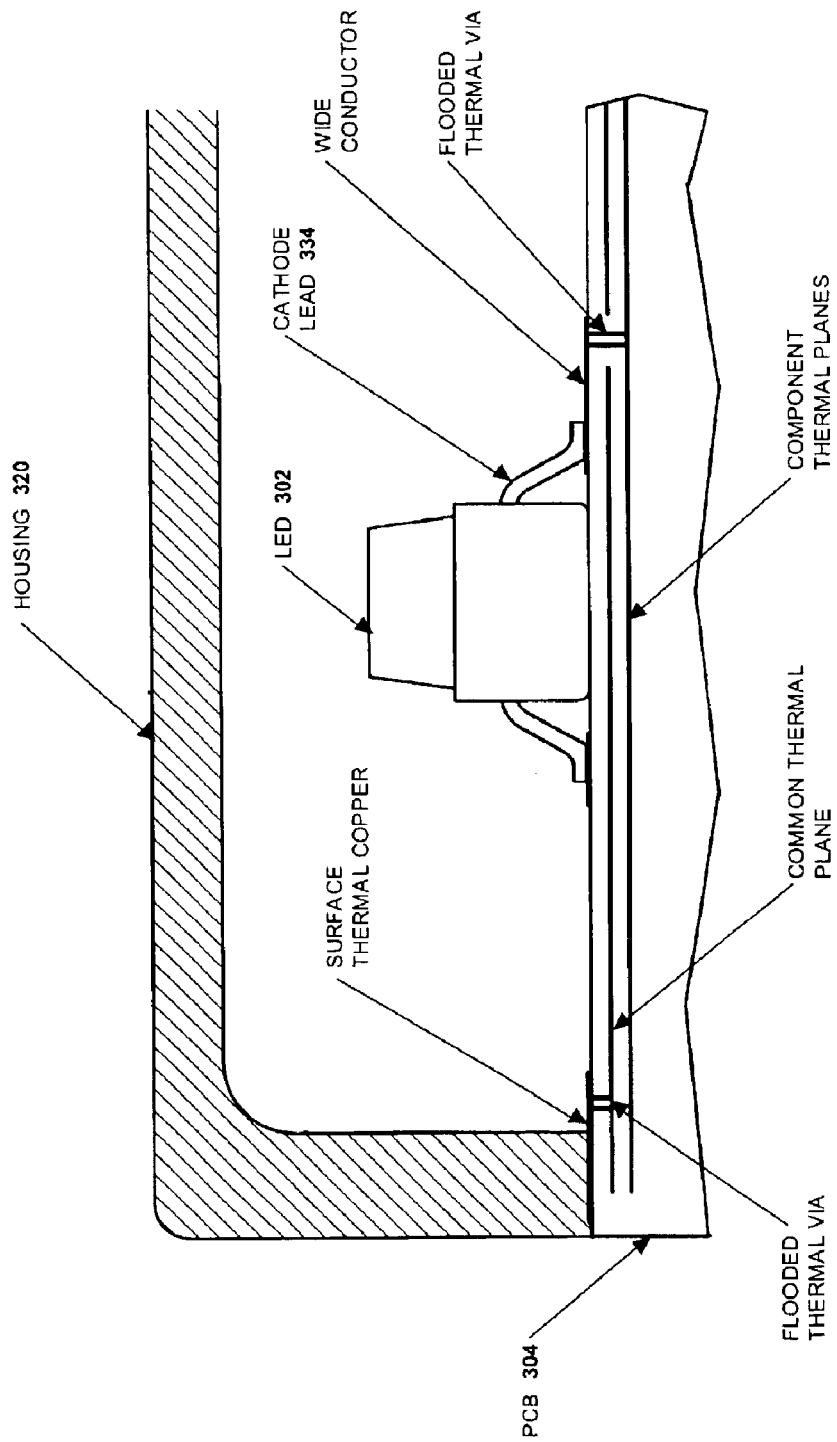

FIGS. 5 and 6 illustrate cross-sectional views of an indicator 300 that provides excellent thermal dissipation for circuit components, such as LEDs and linear current regulators and provides thermal isolation to prevent LED temperatures from being increased by the higher power dissipated by the regulators. First and second set of LEDs 302 are located at the front edge of a PCB 304 on both the top and bottom surfaces. Current regulators 306 are located near the back of the PCB 304 on either top or bottom surfaces. All circuit components are surface mounted on the PCB 304.

A layer of the PCB 304 immediately below top and bottom surface layers 312 is a common thermal plane 314 of copper. The thermal plane 314 is hard connected through many paths, such as flooded vias, to surface copper 312 that makes thermal contact with a metal enclosure 320. The thermal plane 314 reduces hot spots by spreading heat and conducting it to the surface copper 312 and into the enclosure 320. The thermal plane 314 is split into two thermal sections by a thermal separator 322. One thermal section serves the front half of the PCB 304 containing the LEDs 302 and the other serves the back half of the PCB 304 containing the regulators 306.

Below each common thermal plane 314 is a smaller, component thermal plane 328 with patches of copper that are electrically isolated from the thermal plane 314. A patch of copper is connected to the thermally conductive (cathode) lead 334 of the LEDs 302 directly above the patch and another patch is connected to the thermal tab of each of the regulators 306. (The cathode lead of the LEDs 302 has a low thermal resistance to the die. The tab of the regulator also has a low thermal resistance to the junction of that component.) The patches in the thermal plane 328 connect to the component leads by means of a short wire trace or small surface plane and one or more flooded via connections. The patches also spread heat so that it can be conducted to the adjacent thermal plane 314 and in turn to the surface copper 312 and the aluminum enclosure 320. The component thermal planes 328 provide a means of spreading and transferring the heat to the common thermal plane 314 without direct electrical connection.

The common thermal planes 314 and the component thermal planes 328 are separated by a dielectric material, such as without limitation about 0.004–0.005 inches thick. The surface layer 312 and the common thermal plane are also separated by a dielectric material.

In a display panel, LED indicators 100 may be placed adjacent standard incandescent indicators. In one embodiment, the LED indicator includes multiple colored LEDs that provide a closer color match in both bright and dim conditions with adjacent incandescent indicators. Because standard amber LEDs are whiter in color than standard amber incandescent indicators, LEDs with a more red hue are added to the LED indicator, thereby producing a color that more closely matches incandescent amber indicators.

In one nonlimiting example, an LED indicator changes color when operated in a nighttime mode. The LED indicator includes one or more amber 595 nanometer color LEDs for operation in daylight and one or more 605 nanometer orange color LEDs for night viewing. The indicator includes a switch, such as a zener diode, that detects the voltage level received and powers or depowers the amber and orange colored LEDs accordingly. For example, if the detected voltage level is less than 16V, night operation mode exists, so the orange color LEDs are activated and the amber color LEDs are deactivated. The opposite occurs when the detected voltage level is greater than 16V.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A Light Emitting Diode (LED) indicator comprising:
    a housing having a lens and opaque sides; and
    a single printed circuit board contained within the housing approximately perpendicular to the lens and approximately parallel to one or more of the opaque sides, the printed circuit board having first and second sides, the printed circuit board including:
        two or more LEDs attached to the first and second sides of the printed circuit board, when the two or more LEDs are activated they produce light that passes through the lens; and
        one or more current regulators for regulating current supplied to the LEDs.

2. The indicator of claim 1, wherein the single printed circuit board is manufactured using fully automated processes.

3. The indicator of claim 1, wherein the housing includes a reflector for redirecting light generated by the two or more LEDs toward the lens.

4. A Light Emitting Diode (LED) indicator comprising:
    a housing having opaque sides;
    a lens received by the opaque sides; and
    a printed circuit board contained within the housing, the printed circuit board having first and second sides, the printed circuit board including:
        two or more LEDs attached to the first and second sides of the printed circuit board, when the two or more LEDs are activated they produce light that passes through the lens; and
        one or more current regulators for regulating current supplied to the LEDs,
        wherein the printed circuit board is contained within the housing approximately perpendicular to the lens and approximately parallel to one or more of the opaque sides.

5. The indicator of claim 4, wherein the regulator includes a linear current regulator.

6. The indicator of claim 5, wherein the printed circuit board includes first and second thermal dissipation sections.

7. The indicator of claim 6, wherein the first and second thermal dissipation sections are separated by a thermal isolator.

8. The indicator of claim 6, wherein the first thermal dissipation section is thermally connected with the two or more LEDs and the second thermal dissipation section is thermally connected with the linear current regulator.

9. The indicator of claim 7, wherein the housing includes two opposing covers being thermally coupled with the first and second thermal dissipation sections.

10. The indicator of claim 4, wherein the sides of the housing include two opposing covers that form first and second cavities, wherein the second cavity is open at one end that is covered by a cap with a lens, the first cavity covering a first portion of the printed circuit board that include the regulators, the second cavity covering a portion of the printed circuit board that includes two or more the LEDs.

11. The indicator of claim 10, wherein the second cavity is at least partially lined with a reflector for reflecting light generated by the two or more LEDs through the lens.

12. The indicator of claim 4, wherein the two or more LEDs include at least two different colored LEDs.

13. The indicator of claim 4, wherein a first set of two LEDs are connected in series to a first regulator and a second set of two LEDs are connected in series to a second regulator.

14. The indicator of claim 13, the first set of LEDs and the first regulator are attached to the first side of the printed circuit board and the second set of LEDs and the second regulator are attached to the second side of the printed circuit board.

15. The indicator of claim 14, wherein the first and second sides of the printed circuit board include a layer of thermal patches, and a common thermal plane, the patches being electrically coupled to at least one of a lead from the LEDs or a lead from the regulators, wherein the common thermal plane is located between LEDs and patches and regulators and patches.

16. A method of making a Light Emitting Diode (LED) indicator, the method comprising:
    attaching two or more LEDs to first and second sides of a printed circuit board; and
    attaching a regulating circuit to the first side of the printed circuit board,
    covering the printed circuit board with a cover, wherein the cover includes two opaque opposing sections that form first and second cavities, the second cavity being open at one end and being covered by a cap with a lens, the first cavity covering a first portion of the printed circuit board,
    wherein the printed circuit board includes first and second thermal dissipation sections, each section includes at least one thermal plane.

17. The method of claim 16, wherein the regulating circuit includes a linear current regulator.

18. The method of claim 16, further comprising thermally separating the first and second thermal dissipation sections.

19. The method of claim 17, further comprising thermally connecting the first thermal dissipation section with the two or more LEDs and thermally connecting the second thermal dissipation section with the linear current regulator.

20. The method of claim 19, further comprising at least partially surrounding the cover with a heat dissipating cover and thermally connecting one or more of the thermal planes with the heat dissipating cover.

21. The method of claim 19, further comprising partially lining the second cavity with reflector for reflecting light generated by the LEDs through the lens.

22. The method of claim 16, wherein the attached two or more LEDs include at least two different colored LEDs.

* * * * *